United States Patent
Hsu et al.

(10) Patent No.: US 8,533,454 B2
(45) Date of Patent: Sep. 10, 2013

(54) METHOD AND APPARATUS HAVING NULL-ENCRYPTION FOR SIGNALING AND MEDIA PACKETS BETWEEN A MOBILE STATION AND A SECURE GATEWAY

(75) Inventors: Raymond Tah-Sheng Hsu, San Diego, CA (US); Arungundram C. Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1184 days.

(21) Appl. No.: 11/858,714

(22) Filed: Sep. 20, 2007

(65) Prior Publication Data

US 2008/0141021 A1 Jun. 12, 2008

Related U.S. Application Data

(60) Provisional application No. 60/847,195, filed on Sep. 25, 2006.

(51) Int. Cl.
*H04L 29/06* (2006.01)

(52) U.S. Cl.
USPC ............................................ 713/153; 380/18

(58) Field of Classification Search
USPC .................. 713/201, 160, 153; 370/355, 389
See application file for complete search history.

(56) References Cited

U.S. PATENT DOCUMENTS

| | | | |
|---|---|---|---|
| 7,643,455 B2 | 1/2010 | Linder et al. | |
| 7,698,550 B2 | 4/2010 | Abhishek et al. | |
| 2004/0083360 A1* | 4/2004 | Walsh et al. | 713/160 |
| 2004/0098622 A1* | 5/2004 | O'Neill | 713/201 |
| 2006/0198368 A1* | 9/2006 | Guichard et al. | 370/389 |
| 2006/0291455 A1* | 12/2006 | Katz et al. | 370/355 |
| 2008/0095070 A1 | 4/2008 | Chan et al. | |
| 2008/0305792 A1* | 12/2008 | Khetawat et al. | 455/435.1 |

FOREIGN PATENT DOCUMENTS

| | | | |
|---|---|---|---|
| JP | 2007116690 A | 5/2007 | |
| RU | 2003134279 A | 5/2005 | |
| RU | 2265282 C2 | 11/2005 | |
| WO | WO02093811 | 11/2002 | |

(Continued)

OTHER PUBLICATIONS

Archan Misra; IDMP-Based Fast Handoffs and Paging in IP-Based 4G Mobile Networks; IEEE; pp: 1-8.*

(Continued)

*Primary Examiner* — Mohammad W Reza
*Assistant Examiner* — Monjour Rahim
(74) *Attorney, Agent, or Firm* — Liberty E. Mann

(57) ABSTRACT

Disclosed is a method for efficient transport of packets between a mobile station and a secure gateway over a wireless local area network for accessing home services. In the method, a first encryption security association is established for transporting first-type packets from the secure gateway to the mobile station, and a second encryption security association is established for transporting first-type packets from the mobile station to the secure gateway. Next, a first null-encryption security association is established for transporting second-type packets from the secure gateway to the mobile station, and a second null-encryption security association is established for transporting second-type packets from the mobile station to the secure gateway. Second-type packets are selected for transport using the second null-encryption security association based on a traffic selector. Also, second-type packets may be selected for transport using the first null-encryption security association based on a traffic selector. The traffic selector may be preconfigured.

25 Claims, 4 Drawing Sheets

(56) References Cited

FOREIGN PATENT DOCUMENTS

| WO | WO 2006059216 A1 | 6/2006 |
|----|------------------|--------|
| WO | WO2006064323 A1  | 6/2006 |
| WO | WO 2006095269 A1 | 9/2006 |

OTHER PUBLICATIONS

"cdma2000 Packet Data Services; Wireless Local Area Network (WLAN) Interworking: Access to Operator Service and Mobility": Mar. 2007.
International Search Report, PCT/US07/079331, International Search Authority, European Patent Office, Jul. 16, 2008.
Written Opinion, PCT/US07/079331, International Search Authority, European Patent Office, Jul. 16, 2008.
Boman et al., "Detailed Technical Specifications of Security for Heterogenous Access," Information Society Technologies, Jun. 14, 2002, pp. 1-161, Internet Reference.
3rd Generation Partnership Project 2, "Access to Operator Service and Mobility for WLAN Interworking," 3GPP2 X.P0028-200, version 0.3, May 8, 2006, pp. 14 and 30 XP007905112.
3rd Generation Partnership Project 2, "Access to Operator Service and Mobility for WLAN Interworking,"3GPP2 X.P0028-200-A, Version 1.0, Aug. 11, 2007, pp. 1-66, XP007905093.
Anonymous, "Project No. 3-0229, proposed creation of a new TIA Standard, IMS Security approved, to be published as TIA-1091,"EIA/TIA Drafts, Telecommunications Industry Association Arlington, VA, US, Nov. 2, 2005, XP017005246.
Taiwan Search Report—TW096135799—TIPO—Mar. 8, 2012.
"Access to Operator Service and Mobility for WLAN Interworking", [online], 3GPP2 X.S0028-200-A, Jun. 2008, Version 1.0,pp. 45-46, <URL:http://www.3gpp2.org/Public_html/specs/X.S0028-200-A_v1.0_080625.pdf>.
European Search Report—EP11182729, Search Authority—Berlin Patent Office, Nov. 15, 2011.
Wolfgang Bücker et al.,"Final technical report comprising the complete technical results, specification and conclusion", [online], IST-2000-25350, Information society technologies, Nov. 2002, Version 1.0, pp. 1-31, 127-142, <URL:http://www.isrc.rhul.ac.uk/shaman/docs/d13a1v1.pdf>.
Translation of Office Action in Russian application 2009115652 corresponding to U.S. Appl. No. 11/858,714, citing RU2265282, RU2003134279, 3GPP2_pgs_1_66_XP007905093_year_2007, Boman_pgs_1_161_XP007905099_year_2002 and WO2006064323 dated Jan. 26, 2011.

* cited by examiner

METHOD AND APPARATUS HAVING NULL-ENCRYPTION FOR SIGNALING AND MEDIA PACKETS BETWEEN A MOBILE STATION AND A SECURE GATEWAY

CLAIM OF PRIORITY UNDER 35 U.S.C. §119

The present Application for Patent claims priority to: Provisional Application No. 60/847,195, entitled "NULL-ENCRYPTION FOR SIP SIGNALING AND MEDIA PACKETS BETWEEN MS AND PDIF" filed Sep. 25, 2006. This Provisional Application is assigned to the assignee hereof and is hereby expressly incorporated by reference herein.

BACKGROUND

1. Field

The present invention relates generally to wireless communications, and more specifically to selective content protection.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modem communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

Typical mobile subscribers use a mobile station or terminal such as a mobile phone or a laptop to access the wireless communication system. In addition to voice communications, a mobile station may access other network data services, such as Instant Messaging Service (IMS), provisioned by a home 3G system.

A mobile station may have access to a Wireless Local Access Network (WLAN) which could provide an alternative communications channel for accessing network data services provisioned by the home 3G system, without using the home 3G system's "cellular" capacity. FIG. 1 shows the 3G-WLAN interworking architecture. The Mobile Station (MS), via a Wireless Local Area Network (WLAN) system, can access services in MS's home network. The Packet Data Interworking Function (PDIF) acts as a secure gateway guarding the network services (e.g., Instant Messaging Service (IMS)) against unauthorized access. IMS is a SIP-based system that allows the MS to setup Voice over Internet Protocol (VoIP) calls.

In order to access the IMS service from a WLAN system, the MS uses Internet Key Encryption version 2 (IKEv2) to establish a secure IP tunnel with the Packet Data Interworking Function (PDIF). The tunnel establishment is authenticated and authorized by the Home Authentication Authorization Accounting (H-AAA). The dashed line is the path for Authentication, Authorization, Accounting (AAA) information. The solid lines are the bearer path for user data traffic, and the pipe is the secure IP tunnel protecting the user data traffic between the MS and PDIF. After the secure IP tunnel is established, the MS can register with the IMS in the 3G home network. The Session Initiation Protocol (SIP) is used for the MS to communicate with the control entities (e.g., Proxy-Call Session Control Function (P-CSCF)) in the IMS.

However, the secure IP tunnel is inefficient for particular types of traffic. There is therefore a need in the art for a mobile station and 3G network configured to permit the mobile station to efficiently access network data services provisioned by the 3G system, without using the 3G system's "cellular" capacity.

SUMMARY

An aspect of the present invention may reside in a method for efficient transport of packets between a mobile station and a secure gateway over a wireless local area network for accessing home services. In the method, a first encryption security association is established for transporting first-type packets from the secure gateway to the mobile station, and a second encryption security association is established for transporting first-type packets from the mobile station to the secure gateway. Next, a first null-encryption security association is established for transporting second-type packets from the secure gateway to the mobile station, and a second null-encryption security association is established for transporting second-type packets from the mobile station to the secure gateway. Second-type packets are selected for transport using the second null-encryption security association based on a traffic selector. Also, second-type packets may be selected for transport using the first null-encryption security association based on a traffic selector.

In more detailed aspects of the invention, the traffic selector may be preconfigured and known to both the mobile station and the secure gateway. The traffic selector may be a destination and/or source IP address and port number.

Additionally, the traffic selector may developed prior to establishing the first and second encryption security associations, or it may be developed after establishing the first and second encryption security associations. Further, the mobile station may develop the traffic selector and forward the traffic selector to the secure gateway using the second encryption security association, or the secure gateway may develop the traffic selector and forward the traffic selector to the using the first encryption security association.

In other more detailed aspects of the invention, the first and second null-encryption security associations each may be a child security association. Each security association may be a secure IP tunnel. The home services may be provided by a third-generation mobile phone home network. The secure gateway may be a packet data interworking function. The second-type packets selected for transport using the second null-encryption security association may be previously encrypted voice-over-IP packets, or they may be are previously encrypted session initiation protocol packets.

Another aspect of the invention may reside in a mobile station including means for establishing a first encryption security association for transporting first-type packets over a wireless local area network from a secure gateway to the mobile station, means for establishing a second encryption security association for transporting first-type packets over the wireless local area network from the mobile station to the secure gateway, means for establishing a first null-encryption security association for transporting second-type packets over the wireless local area network from the secure gateway to the mobile station, means for establishing a second null-encryption security association for transporting second-type packets over the wireless local area network from the mobile station to the secure gateway, and means for selecting second-type packets for transport using the second null-encryption security association based on a traffic selector.

Yet another aspect of the invention may reside is computer program product comprising computer readable medium comprising code for causing a computer to establish a first encryption security association for transporting first-type packets over a wireless local area network from a secure gateway to a mobile station, code for causing a computer to establish a second encryption security association for transporting first-type packets over the wireless local area network from the mobile station to the secure gateway, code for causing a computer to establish a first null-encryption security association for transporting second-type packets over the wireless local area network from the secure gateway to the mobile station, code for causing a computer to establish a second null-encryption security association for transporting second-type packets over the wireless local area network from the mobile station to the secure gateway, and code for causing a computer to select second-type packets for transport using the second null-encryption security association based on a traffic selector.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 2:
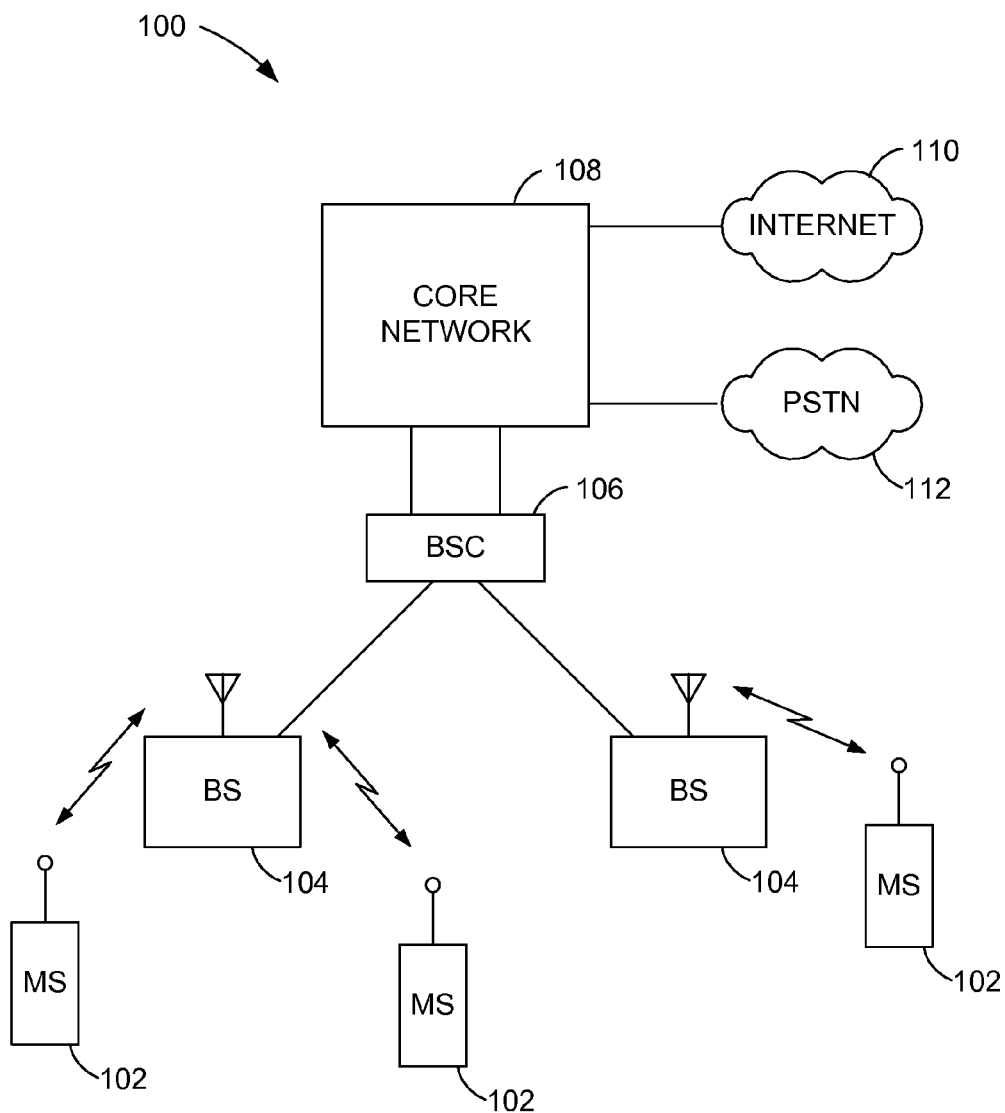
FIG. 2 is an example of a wireless communication system.

With reference to FIG. 2, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

With reference again to FIG. 1, the MS can access services provided by the MS's home third-generation (3G) network 18. A Packet Data Interworking Function (PDIF) 20 acts as a secure gateway guarding the 3G network services from unauthorized use. Since Session Initiation Protocol (SIP) signaling exchanged between the MS and the P-CSCF is already encrypted via IPsec transport mode, the method and apparatus can disable IPsec encryption on the SIP signaling messages transported between the MS and the PDIF. The goal is to avoid nested IPsec encryption/decryption on the SIP signaling messages at the MS.

Since encryption/decryption of VoIP media packets (one per 20 msec) could incur non-trivial processing load in PDIF and MS, IPsec encryption should be disabled on VoIP media packets transported between MS and PDIF. The method and apparatus described below conserves processing resources in the MS and more particularly, in the PDIF that supports many MSs.

While disabling IPsec encryption for SIP signaling and VoIP media packets is desired, it is preferred to apply IPsec encryption on other non-IMS packet flows (e.g., e-mail messages, IM, etc.).

The goal of the method is for the MS and PDIF to establish two IPsec SAs in each direction. (Two IPsec SAs in each direction are needed because each IPsec SA is uni-directional.) One IPsec SA is for encryption, and the other IPsec SA is for null-encryption. The MS configures the traffic selectors in the Security Policy Database (SPD) such that the null-encryption IPsec SA is applied to SIP signaling messages and optionally to VoIP media packets, and the encryption IPsec SA is applied to other traffic.

During initial IKEv2 negotiation, MS and PDIF establish a default IPsec SA for encrypting all traffic (initially non-IMS packets) destined for and originated from the MS. During the establishment of this IPsec SA, the MS and PDIF use IKEv2 to configure the traffic selectors in the SPD, such that the encryption IPsec SA will apply to all packets destined for the MS's IP address and all packets originating from the MS's IP address.

When the MS wants IMS service, the MS performs SIP registration. Via the exchange of SIP REGISTER/2000K with the P-CSCF, the MS obtains the client/server port numbers that will be used for carrying subsequent SIP signaling messages, and these messages will be protected by IPsec encryption between the MS and P-CSCF. After the MS obtains the client/server port numbers, the MS uses Create-Child-SA exchange to establish a null-encryption IPsec SA for SIP signaling and optionally for VoIP media packets. During the establishment of the null-encryption IPsec SA, the MS and PDIF use IKEv2 to configure the traffic selectors in the SPD, such that the null-encryption IPsec SA will be applied to packets with the client/server port numbers (indicating the packets are carrying encrypted SIP signaling messages).

Moreover, the MS and PDIF may configure additional traffic selectors in the SPD such that the null-encryption IPsec SA will apply to VoIP media packets. There are two methods to do this:

1) If the MS is statically configured to always send VoIP media packets with source port x and receive VoIP media packets with destination port y, then during the establishment of the null-encryption IPsec SA, the MS can configure additional traffic selectors (for ports x and y) in the SPD, such that the null-encryption IPsec SA will be applied to MS-originated packets with port x and MS-terminated packets with port y.

2) If the port numbers are dynamically chosen for every VoIP session, then in the beginning of every VoIP session the MS knows which port (for example, port u) it will use to send VoIP media packets and which port (for example, port v) it will use to receive VoIP media packets. The MS can use IKEv2 Informational Exchange to update the traffic selectors (for ports u and v) in the SPD, such that the null-encryption IPsec SA will be applied to MS-originated packets with port u and MS-terminated packets with port v.

The MS has the following behaviors: after the MS obtains client/server port numbers from the SIP exchange, the MS uses IKEv2 to establish a null-encryption IPsec SA for packets with those client/port numbers (these packets will be carrying encrypted SIP signaling messages, and thus do not need to be encrypted again between the MS and the PDIF); and the MS may use IKEv2 to configure traffic selector in the SPD to apply null encryption IPsec SA on VoIP media packets. The PDIF has the following behaviors: support for null-encryption IPsec SA of SIP signal messaging; and support for null-encryption IP sec SA for VoIP media packets.

Figure 1:
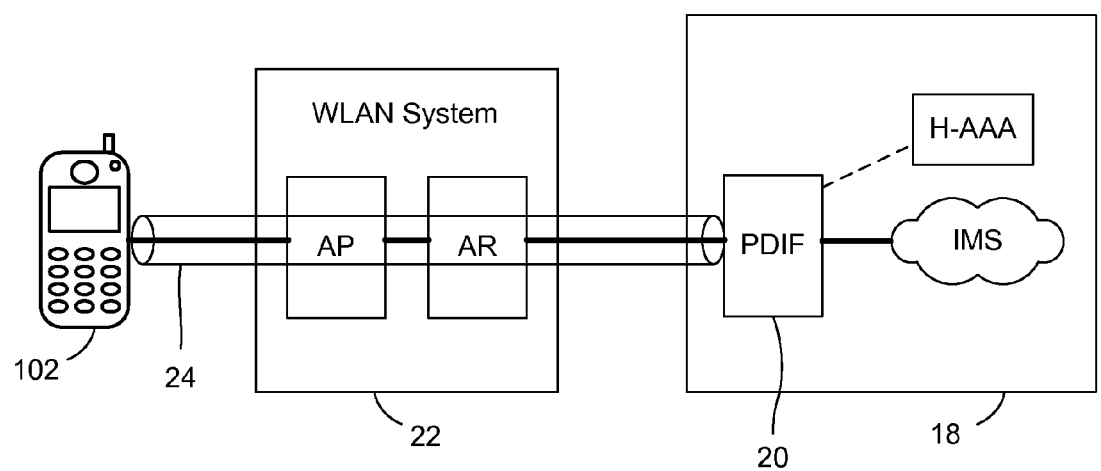
FIG. 1 is a block diagram of a mobile station communicating with a home 3G system through a wireless local area network.
Figure 3:
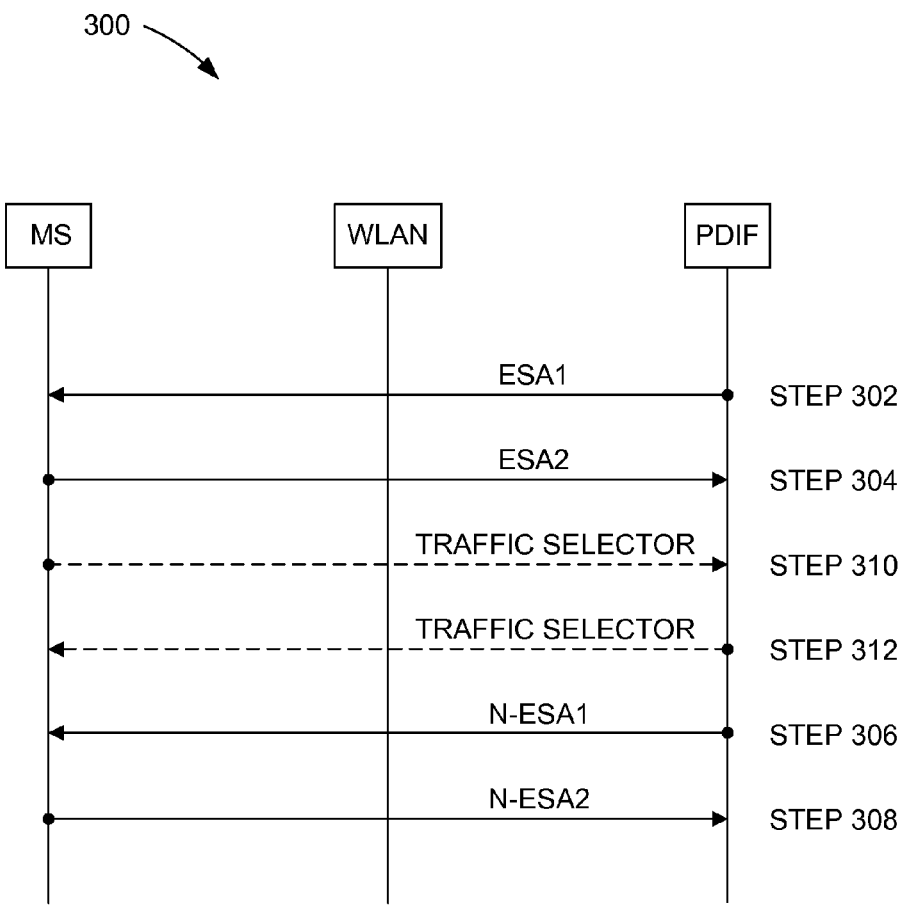
FIG. 3 is a flow diagram of a method for establishing security associations between a mobile station and a secure gateway.

With reference to FIGS. 1 and 3, one aspect of the present invention may reside in a method 300 for efficient transport of packets between a mobile station MS 102 and a secure gateway 20 (e.g., a PDIF) over a wireless local area network WLAN 22 for accessing home services. In the method, a first encryption security association ESA1 is established for transporting first-type packets from the secure gateway to the mobile station (step 302), and a second encryption security association ESA2 is established for transporting first-type packets from the mobile station to the secure gateway (step 304). Next, a first null-encryption security association N-ESA1 is established for transporting second-type packets from the secure gateway to the mobile station (step 306), and a second null-encryption security association N-ESA2 is established for transporting second-type packets from the mobile station to the secure gateway (step 308). Second-type packets are selected for transport using the second null-encryption security association based on a traffic selector. Also, second-type packets may be selected for transport using the first null-encryption security association based on a traffic selector.

The first-type packets are those packets requiring encryption, and are transported using the first and second encryption security associations. The second-type packets are those packets that are already encrypted (e.g., SIP signaling, VoIP, etc.), and are transported using the first and second null-encryption security associations.

The traffic selector may be preconfigured and known to both the mobile station and the secure gateway. The traffic selector may be a destination and/or source IP address and port number. A packet's type may be determined by an associated IP address and/or port number.

Alternatively, the traffic selector may developed prior to establishing the first and second encryption security associations, or it may be developed after establishing the first and second encryption security associations. For example, the mobile station may develop the traffic selector and forward the traffic selector to the secure gateway using the second encryption security association (step 310), or the secure gateway may develop the traffic selector and forward the traffic selector to the using the first encryption security association (step 312).

In other more detailed aspects of the invention, the first and second null-encryption security associations each may be a child security association. Each security association may be a secure IP tunnel 24. The home services may be provided by a third-generation mobile phone home network 18. The secure gateway may be a packet data interworking function 20. The second-type packets selected for transport using the second null-encryption security association may be previously encrypted voice-over-IP (VoIP) packets, or they may be are previously encrypted session initiation protocol (SIP) packets.

Figure 4:
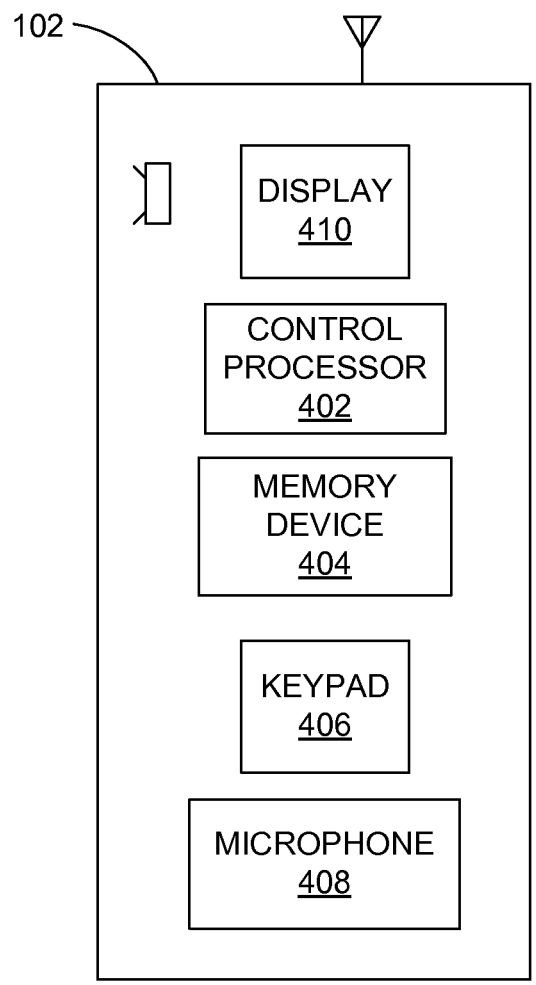
FIG. 4 is a block diagram of a mobile station.

With reference to FIG. 4, another aspect of the invention may reside in a mobile station 102 including means for establishing a first encryption security association for transporting first-type packets over a wireless local area network from a secure gateway to the mobile station, means for establishing a second encryption security association for transporting first-type packets over the wireless local area network from the mobile station to the secure gateway, means for establishing a first null-encryption security association for transporting second-type packets over the wireless local area network from the secure gateway to the mobile station, means for establishing a second null-encryption security association for transporting second-type packets over the wireless local area network from the mobile station to the secure gateway, and means for selecting second-type packets for transport using the second null-encryption security association based on a traffic selector. The means described above may include a control processor 402. The mobile station may further include a memory device 404, keypad, 406, microphone 408, display 410, speaker, antenna, etc., as is typical of a mobile phone.

Yet another aspect of the invention may reside is computer program product comprising computer readable medium, such as the memory device 404, comprising code for causing a computer to establish a first encryption security association for transporting first-type packets over a wireless local area network from a secure gateway to a mobile station, code for causing a computer to establish a second encryption security association for transporting first-type packets over the wireless local area network from the mobile station to the secure gateway, code for causing a computer to establish a first null-encryption security association for transporting second-type packets over the wireless local area network from the secure gateway to the mobile station, code for causing a computer to establish a second null-encryption security association for transporting second-type packets over the wireless local area network from the mobile station to the secure gateway, and code for causing a computer to select second-type packets for transport using the second null-encryption security association based on a traffic selector.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for efficient transport of packets between a mobile station and a secure gateway over a wireless local area network for accessing home services, comprising:
    establishing a first encryption security association for transporting first-type packets from the secure gateway to the mobile station, and establishing a second encryption security association for transporting first-type packets from the mobile station to the secure gateway;

establishing a first null-encryption security association for transporting second-type packets from the secure gateway to the mobile station, and establishing a second null-encryption security association for transporting second-type packets from the mobile station to the secure gateway; and selecting second-type packets for transport using the second null-encryption security association based on a traffic selector, wherein the traffic selector is developed by the mobile station or the secure gateway after establishing the first and second encryption security associations and the traffic selector enables the home services between the mobile station and the secure gateway in a mobile phone home network.

2. A method for efficient transport of packets as defined in claim 1, wherein the traffic selector is preconfigured and known to both the mobile station and the secure gateway.

3. A method for efficient transport of packets as defined in claim 1, wherein the traffic selector is a destination IP address and port number.

4. A method for efficient transport of packets as defined in claim 1, wherein the traffic selector is a source IP address and port number.

5. A method for efficient transport of packets as defined in claim 1, wherein the traffic selector is developed prior to establishing the first and second encryption security associations.

6. A method for efficient transport of packets as defined in claim 1, wherein the mobile station develops the traffic selector and forwards the traffic selector to the secure gateway using the second encryption security association.

7. A method for efficient transport of packets as defined in claim 1, wherein the secure gateway develops the traffic selector and forwards the traffic selector to the mobile station using the first encryption security association.

8. A method for efficient transport of packets as defined in claim 1, wherein the first and second null-encryption security associations are each a child security association.

9. A method for efficient transport of packets as defined in claim 1, wherein each security association is a secure IP tunnel.

10. A method for efficient transport of packets as defined in claim 1, wherein the home services are provided by a third-generation mobile phone home network.

11. A method for efficient transport of packets as defined in claim 1, wherein the secure gateway is a packet data interworking function.

12. A method for efficient transport of packets as defined in claim 1, wherein the second-type packets selected for transport using the second null-encryption security association are previously encrypted voice-over-IP packets.

13. A method for efficient transport of packets as defined in claim 1, wherein the second-type packets selected for transport using the second null-encryption security association are previously encrypted session initiation protocol packets.

14. A method for efficient transport of packets as defined in claim 1, further comprising selecting packets for transport using the first null-encryption security association based on a traffic selector.

15. A mobile station, comprising:
means for establishing a first encryption security association for transporting first-type packets over a wireless local area network from a secure gateway to the mobile station;
means for establishing a second encryption security association for transporting first-type packets over the wireless local area network from the mobile station to the secure gateway;
means for establishing a first null-encryption security association for transporting second-type packets over the wireless local area network from the secure gateway to the mobile station;
means for establishing a second null-encryption security association for transporting second-type packets over the wireless local area network from the mobile station to the secure gateway; and
means for selecting second-type packets for transport using the second null-encryption security association based on a traffic selector, wherein the traffic selector is developed by the mobile station or the secure gateway after establishing the first and second encryption security associations and the traffic selector enables home services between the mobile station and the secure gateway in a mobile phone home network.

16. A mobile station as defined in claim 15, wherein the traffic selector is preconfigured and known to both the mobile station and the secure gateway.

17. A mobile station as defined in claim 15, wherein the traffic selector is a destination IP address and port number.

18. A mobile station as defined in claim 15, wherein the traffic selector is a source IP address and port number.

19. A mobile station as defined in claim 15, wherein the first and second null-encryption security associations are each a child security association.

20. A mobile station as defined in claim 15, wherein each security association is a secure IP tunnel.

21. A mobile station as defined in claim 15, wherein the secure gateway is a packet data interworking function.

22. A mobile station as defined in claim 15, wherein the second-type packets selected for transport using the second null-encryption security association are previously encrypted voice-over-IP packets.

23. A mobile station as defined in claim 15, wherein the second-type packets selected for transport using the second null-encryption security association are previously encrypted session initiation protocol packets.

24. A computer program product, comprising:
non-transitory computer readable medium comprising:
code for causing a computer to establish a first encryption security association for transporting first-type packets over a wireless local area network from a secure gateway to a mobile station,
code for causing a computer to establish a second encryption security association for transporting first-type packets over the wireless local area network from the mobile station to the secure gateway;
code for causing a computer to establish a first null-encryption security association for transporting second-type packets over the wireless local area network from the secure gateway to the mobile station;
code for causing a computer to establish a second null-encryption security association for transporting second-type packets over the wireless local area network from the mobile station to the secure gateway; and
code for causing a computer to select second-type packets for transport using the second null-encryption security association based on a traffic selector, wherein the traffic selector is developed by the mobile station or the secure gateway after establishing the first and second encryption security associations and the traffic selector enables home services between the mobile station and the secure gateway in a mobile phone home network.

25. An apparatus, comprising:

a memory device; and a control processor configured to:

establish a first encryption security association for transporting first-type packets from a secure gateway to a mobile station, establish a second encryption security association for transporting first-type packets from the mobile station to the secure gateway, establish a first null-encryption security association for transporting second-type packets from the secure gateway to the mobile station, establish a second null-encryption security association for transporting second-type packets from the mobile station to the secure gateway, and select second-type packets for transport using the second null-encryption security association based on a traffic selector, wherein the traffic selector is developed by the mobile station or the secure gateway after establishing the first and second encryption security associations and the traffic selector enables home services between the mobile station and the secure gateway in a mobile phone home network.

* * * * *